United States Patent [19]
Smead

[11] Patent Number: 5,264,777
[45] Date of Patent: Nov. 23, 1993

[54] SYSTEM FOR ISOLATING COMMONLY CHARGED BATTERIES

[75] Inventor: David E. Smead, Seattle, Wash.

[73] Assignee: Ample Power Company, Seattle, Wash.

[21] Appl. No.: 734,961

[22] Filed: Jul. 24, 1991

[51] Int. Cl.⁵ .............................................. H02J 7/00
[52] U.S. Cl. .......................................... 320/6; 320/15
[58] Field of Search ........................ 320/5, 6, 8, 9, 10, 320/11, 15, 19, 31, 32, 39, 40

[56] References Cited

U.S. PATENT DOCUMENTS 3,763,415 10/1973 Ownby ..................................... 320/6
4,017,779 4/1977 McDonald et al. .................... 320/15

Primary Examiner—Kristine L. Peckman
Attorney, Agent, or Firm—Seed and Berry

[57] ABSTRACT

A battery isolator for selectively connecting a pair of batteries to each other to allow both batteries to be charged by a charger connected to one of the batteries while allowing the batteries to be separately discharged. The batteries are selectively connected to each other through an electronic switch. The system includes an analog-to-digital converter for measuring the voltage of the batteries, and a microprocessor for opening and closing the switch as a function of predetermined relationships between the measured voltages of the batteries.

16 Claims, 10 Drawing Sheets

SYSTEM FOR ISOLATING COMMONLY CHARGED BATTERIES

DESCRIPTION

1. Technical Field

This invention generally relates to the charging of batteries. In particular, it relates to an isolator connected between two or more batteries to allow the batteries to be separately connected to a load and yet be charged from a common source.

2. Background of the Invention

It is often necessary to charge multiple batteries from a single charger, such as an alternator, battery charger, solar panel, or wind generator. Common situations in which multiple batteries may be charged from a single source are in automobiles or vessels having a reserve engine starter battery and an accessory battery that supplies power when the engine is not running. The reserve battery should remain charged to permit engine starting.

In the prior art, there are two common ways to isolate multiple batteries so that they may be used individually and yet still be charged from a single charger. The first, shown in FIG. 1A, uses a mechanical contact switch or relay to selectively connect the charger to either or both of the batteries. When the batteries are to be charged, the switch should be actuated to the position connecting the charger to both batteries. In this position, the switch also connects the batteries to each other. However, the batteries should be isolated from each other during use. Isolating the batteries from each other during use prevents the accessories from discharging the reserve battery when the accessories are being driven by the accessory battery.

The use of mechanical switches for battery isolation has several problems. First, since the switches are manually operated, they inadvertently can be left in the incorrect position, thus either discharging the reserve battery along with the accessory battery or charging one battery at a time. Additionally, pitting or corrosion may contaminate the switch contacts, resulting in poor performance. Also, since large currents may flow, mechanical switch contacts must be rated for the maximum loads expected, thus making the switches large and expensive.

The other common isolation method, shown in FIG. 1B, uses diodes to isolate the batteries. This allows current to flow from the charger to each battery, but not from one battery the other. Since the charger is common to both diodes, it is more economical to connect one end of the diodes to a common post rather than run multiple wires from the charger to the individual diodes.

Problems also exist with the use of diodes for battery isolation. Current flowing through a diode creates a voltage drop across the diode. The charger must thus output a higher voltage to compensate for this diode drop in order to fully charge the battery. Furthermore, because two diodes do not usually exhibit the same voltage drop, the voltage applied to the two batteries may differ thus causing the batteries to be charged unequally. This problem is magnified if the accessory battery is loaded during charging since the voltage drop across the diode connected to the accessory battery is current-dependent. The current draw from the accessory battery by the load during charging causes the charger to deliver more current to the accessory battery. As a result, the voltage drop across the diode is increased, thus reducing the voltage that is applied to the accessory battery. Yet an accessory battery, which is specially designed to be deep cycled, may need to be charged at a faster rate than a reserve battery, which is only used periodically. The accessory battery can be charged at this higher voltage only by overcharging the reserve battery. Finally, diodes dissipate heat and, for large currents, may require a substantial heat sink that is expensive, requires considerable space, and must be cooled by circulating air.

Therefore, a need has existed for an isolator disposed between batteries so that a single charger can charge both batteries, but without the drawbacks of mechanical switches or diode isolators.

SUMMARY OF THE INVENTION

It is an object of the invention to provide a means of charging two or more batteries from a common source yet automatically isolating the batteries from each other while they are being discharged.

It is still another object of the invention to provide a means of selectively isolating two or more batteries from each other without the problems and limitations of conventional mechanical switch and diode type isolators.

It is a further object of the invention to provide a battery isolator that also provides voltage regulation of a battery that is connected to a battery being charged.

It is a still further object of the invention to provide a battery isolator that is capable of regulating the voltage of a battery being charged in accordance with a schedule containing a plurality of setpoint values that are used at predetermined times and events.

These and other objects of the invention are provided by a battery isolator for isolating a first battery from a second battery while allowing the first and second batteries to be charged by a common battery charger. An electrically controlled switch connected between the first and second batteries selectively allows current to flow between the batteries. The isolator also includes a voltage measuring circuit that senses the voltage on the first and second batteries and generates corresponding output signals. A controller controls the opening and closing of the switch in response to the output signals of the voltage measuring circuit in accordance with a predetermined relationship between the voltages of the first and second batteries. As a result, the switch selectively permits current to flow to the second battery from a battery charger connected to the first battery while isolating the first and second batteries from each other when the batteries are being discharged.

The battery isolator preferably prevents current from flowing from the second battery to the first battery by opening the switch whenever the voltage of the second battery is either greater than the voltage of the first battery or larger than a setpoint value which may assume a variety of values during a charging cycle.

The electronically controlled switch has a predetermined resistance, which is taken into account by the controller to calculate a current flow between the batteries based on the voltages of the first and second batteries. The controller then opens the switch when the calculated current flow through the switch is greater than a predetermined magnitude.

The battery voltages are preferably measured by an analog-to-digital converter generating respective first and second digital words indicative of the voltages of the first and second batteries. The controller is preferably a properly programmed microprocessor receiving the first and second digital words from the analog-to-digital converter. The microprocessor has an output port operatively connected to the switch to allow the microprocessor to open and close the switch in accordance with a predetermined relationship between the battery voltages as indicated by the first and second digital words from the analog-to-digital converter.

The semiconductor switch is preferably a pair of MOSFET transistors having their drains connected to respective batteries and their sources and gates connected to each other.

DETAILED DESCRIPTION OF THE INVENTION

Figure 1A:
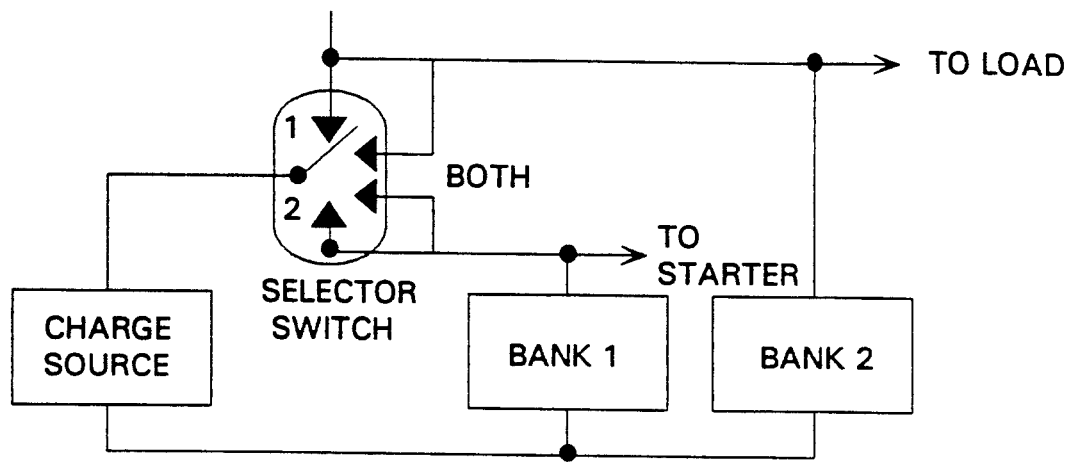
FIG. 1A is a block diagram of a typical prior art isolator using a mechanical switch which enables two batteries to be charged from a common charger.
Figure 1B:
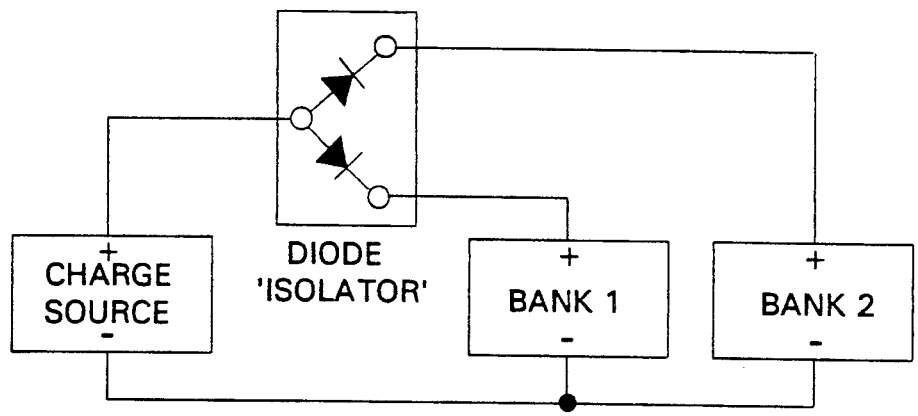
FIG. 1B is a block diagram of a typical prior art isolator using diodes which enables two batteries to be charged from a common charger.
Figure 2:
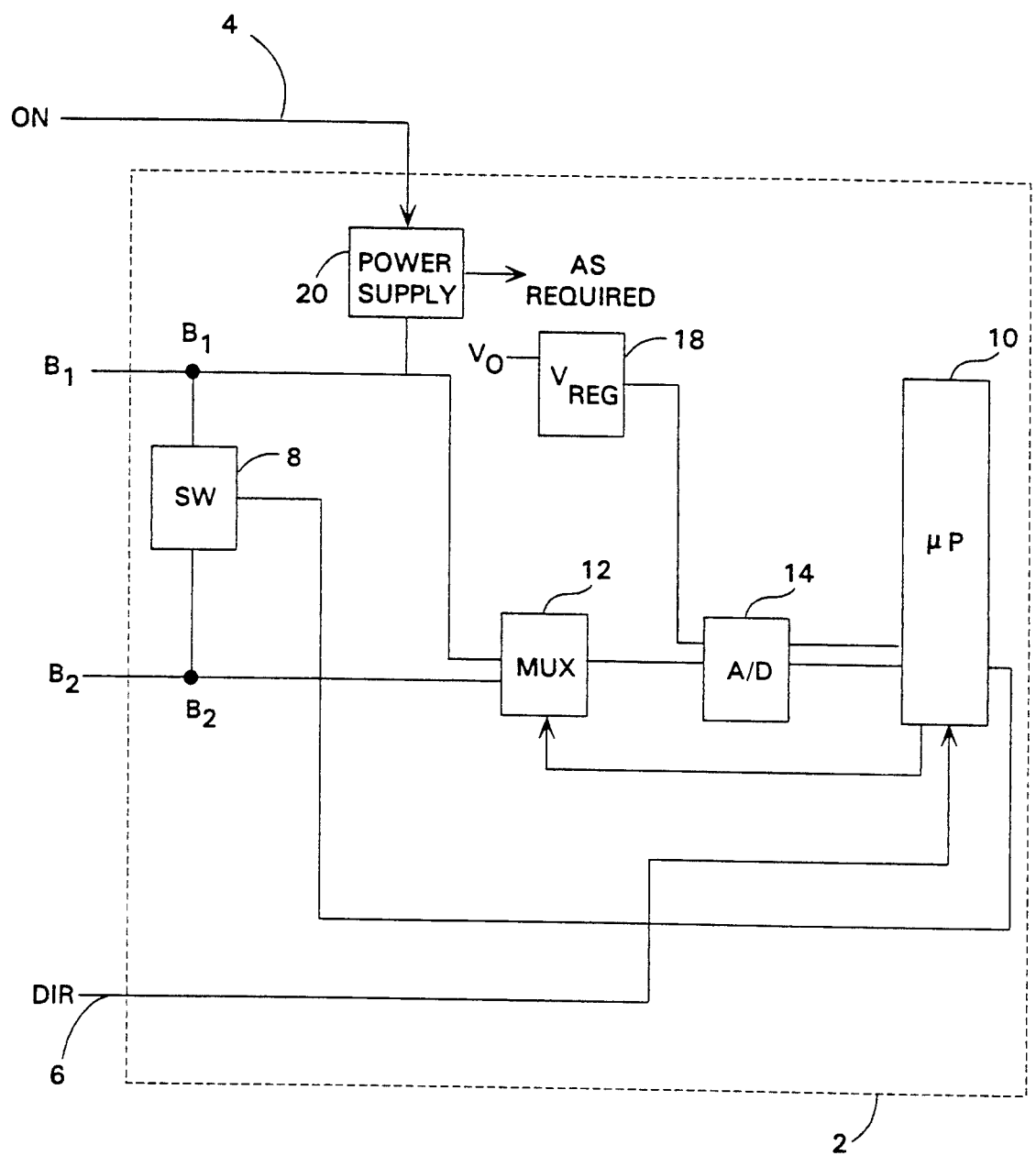
FIG. 2 is a block diagram of a preferred embodiment of the inventive isolator which enables two batteries to be charged from a common charger.

A preferred embodiment of the present invention is illustrated in block form in FIG. 2. An isolator 2 is connected between two batteries (not shown) through respective power terminals B1 and B2 and a common ground. For the purpose of explaining the operation of the present invention, it is assumed that a charger is also connected to power terminal B1. It is to be remembered, however, that the charger may also connect to power terminal B2.

The isolator permits current to flow between the power terminals B1 and B2 is only a single direction. The permitted direction of current flow is designated by a signal applied to a direction control ("DIR") line 6. The logic level on the DIR line can be controlled by, for example, a single-pole, double-throw switch to connect the DIR line alternately to voltages corresponding to logic LOW and logic HIGH. When a logic HIGH is applied to the DIR line, current can flow only from power terminal B1 to B2. When logic LOW is applied to the DIR line, current can flow only from power terminal B2 to power terminal B1. In this manner, the isolator 2 permits a single charger connected to one power terminal to charge the isolated battery when various conditions are fulfilled.

As shown in FIG. 2, the power terminals B1 and B2 are selectively connected to each other by a switch 8. The switch 8 is opened and closed under the control of a signal generated at the output port of a processor 10.

The processor 10 alternately samples the voltage on the power terminals B1 and B2 to determine whether to open or close the switch 8. The power terminals B1 and B2 are connected to respective inputs of a multiplexer 12. The inputs to the multiplexer 12 are selectively applied to an analog-to-digital converter 14 under control of a signal from an output port of the processor 10. The analog-to-digital converter 14 also receives a precision voltage reference from a voltage regulator 18 of conventional design. The output of the analog-to-digital converter 14 in an 8-bit digital word indicative of the votage on either power terminal B1 or B2. The 8-bit output of the analog-to-digital converter 14 is applied to the data bus of the multiplexer 12.

The operating power for the isolator 2 is supplied by an internal power supply 20 of conventinal design.

As previously indicated, the operation of the switch 8 and the multiplexer 12 is controlled by the processor 10. The processor 10 operates under the control of a software program which determines the various conditions under which the switch 8 is turned on. The software program is described subsequently.

Figure 3:
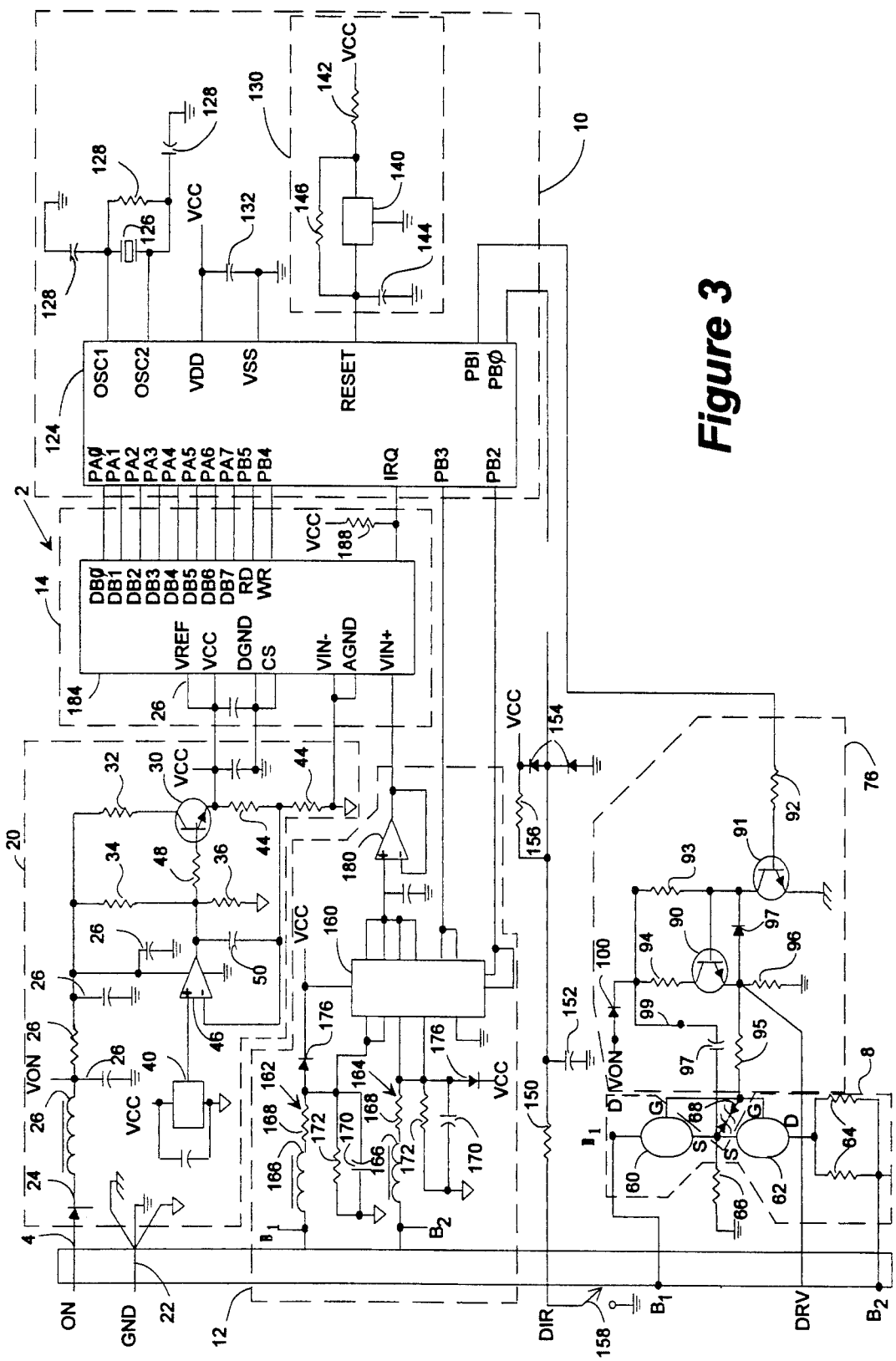
FIG. 3 is a schematic diagram of the preferred embodiment of the present invention.

A preferred embodiment of the block diagram of FIG. 2 is shown in schematic form in FIG. 3. It should be noted that in this preferred embodiment, all voltages discussed are taken with reference to a common ground connection 22 which also includes a return for the batteries and charger. When a sufficiently positive voltage is applied to the ON line 4, the power supply 20 supplies operational power to the isolator 2. As shown in FIG. 3, the power supply 20 includes a reverse polarity protection diode 24 and various components forming a low pass filter 26 of conventional design. With the ON voltage applied, operating power $V_{cc}$ is distributed as required to power the isolator 2 via an emitter-follower transistor 30 and load resistor 32. The base of transistor 30 is biased at an appropriate voltage by resistors 34 and 36.

According to the preferred embodiment, $V_{cc}$ is an accurately controlled voltage source derived from a voltage reference 40. As is well known in the art, the transistor 30 provides a low output impedance in order to maintain $V_{cc}$ relatively constant as the load driven by the transistor 30 varies. A fixed portion of the voltage provided by the transistor 30 derived by precision voltage dividing resistors 44 is applied as negative feedback to the inverting input of an operational amplifier 46. The operational amplifier 46 then applies a voltage to the base of transistor 30 through resistor 48 that sets the feedback voltage derived from the resistors 44 equal to the voltage from the voltage reference 40. Capacitor 50 is provided to ensure stability of the feedback loop. Transistor 30 thus output a supply voltage $V_{cc}$ that is a fixed multiple of the voltage output by the voltage reference 40.

The switch 8 (FIGS. 2 and 3) connected between the power terminals B1 and B2 includes a series network of a MOSFET 60, a MOSFET 62, and a parallel combination of two high power, low resistance resistors 64. Connecting the sources of the MOSFET transistors 60 and 62 together, as illustrated in FIG. 3, is highly advantageous in ensuring complete isolation between the power terminals B1 and B2. By series connecting the MOSFETs 60 and 62 in the above manner, parasitic diodes connected between each transistor's drain and source are series connected in opposing directions. As a result, current cannot flow through the parasitic diodes when the MOSFET transistors 60 and 62 are turned off.

The MOSFET transistors 60 and 62 are characterized by an ohmic resistance between their drain and source terminals when fully turned on. By ensuring that the MOSFETs are fully turned on, their ohmic resistance can be added together, along with the parallel combination of the resistors 64, to limit the current flow between power terminals B1 and B2.

Resistor 66 connected between the sources of MOSFET transistors 60, 62 and ground is used to bias the transistors 60 and 62. Series connected Zener diodes 68 protect the transistors 60, 62 by limiting the potential that can be applied between their respective gates and sources.

The MOSFET transistors 60 and 62 are switched between a fully off or a fully on condition by a driver network 76. The driver network 76, which is connected to the gates of the MOSFET transistors 60 and 62, includes a pair of NPN transistors 90 and 91. Transistor 91 receives a control signal from an output port of the processor 10 through resistor 92. The transistor 91 inverts this control signal and applies it to the base of transistor 90. The base of transistor 90 is normally biased on through resistor 93.

In operation, when the voltage applied to the base of transistor 91 is low, transistor 91 is cut off, thereby allowing transistor 90 to be turned on through resistor 93. Current then flows through resistor 94 and transistor 90 to turn on the MOSFET transistors 60, 62 through resistor 95. When the voltage applied to the base of transistor 91 is high, transistor 91 is turned on, thereby turning off transistor 90 so that the MOSFET transistors 60, 62 are biased off through diode 97. The transistor 90 also controls the logic level of a DRV output which can be used to control external MOSFETs or other switches for higher current applications.

The signal that the transistor 90 applies to the gates of the MOSFET transistors 60, 62 is approximately equal to the voltage on the battery terminals B1 and B2. When the MOSFET transistors 60, 62 switch on, the drains and sources of each of the MOSFET transistors 60, 62 are connected to each other, thereby causing the sources of the MOSFET transistors 60, 62 to also rise substantially to the respective battery voltage on terminals B1 and B2. As a result, the gate-to-source voltage that turned on the MOSFET transistors 60, 62 would no longer exist, thereby turning off the MOSFET transistors 60, 62. In order to prevent the MOSFET transistors 60, 62 from being turned off and on in this manner, the voltage on the gates of the MOSFET transistors 60, 62 is automatically boosted by a corresponding amount when the MOSFET transistors 60, 62 turn on.

Prior to the transistor 90 turning on the MOSFET transistors 60, 62, the sources of the MOSFET transistors 60, 62 are at ground potential. As a result, capacitor 97 is charged to the voltage $V_{ON}$ less the voltage drop across diode 100. As explained above, when the MOSFET transistors 60, 62 are turned on, the voltage at their sources rises to close to the battery voltage. This voltage rise is coupled through the capacitor 97 so that the voltage on the cathode of diode 100 rises from approximately the $V_{ON}$ voltage to approximately twice the $V_{ON}$ voltage. This voltage is applied to transistor 90 through resistor 94 so that the transistor 90 can now supply the gates of the MOSFET transistors 60, 62 with approximately twice the battery voltage through resistor 95. The gate-to-source voltage needed to turn on the MOSFET transistors 60, 62 is thus automatically maintained.

Even though the diode 100 prevents the capacitor 97 from discharging through the power supply, the capacitor 97 does discharge slowly through the transistor 90. It is therefore necessary for the MOSFET transistors 60, 62 to be periodically turned off and then on again, as described below.

As mentioned above, the control signal applied to the driver network 76 is generated by the processor 10. The processor 10 includes a microprocessor 124, a crystal 126 and associated components 128, a power-up reset controller circuit 130, and a filter capacitor 132, all of which are conventional.

The power-up reset circuit 130 includes a conventional power-up reset integrated circuit 140 that is supplied with power supply voltage $V_{cc}$ through a resistor 142. The circuit 140 shunts capacitor 144 to ground as long as the power supply voltage $V_{cc}$ is below a predetermined value. When the circuit 140 senses that $V_{cc}$ has risen to an appropriate value, it releases the capacitor 144 from ground potential, thereby allowing the capacitor 144 to charge through resistor 146. Thus, the microprocessor 124 is held in a reset condition until the power supply voltage $V_{cc}$ has stabilized.

The microprocessor 124 uses 14 bidirectional I/O ports, labeled ports PA0-7 and PB0-5. Port PB1 controls the operation of the switch driver network 76, port PB0 receives a logic input signal DIR which controls the permitted direction of current flow through the switch 8, port PB3 controls the multiplexer 12 as subsequently described, ports PB4 and PB5 control the analog-to-digital converter 14, and ports PA0-7 receive the 8-bit digital word indicative of the analog voltage applied to the input of the analog-to-digital converter 14.

As mentioned above, the direction of permissible current flow through the switch 8 is controlled by a logic signal applied on DIR input to the isolator 2. This level is applied to port PB0, after being filtered by a low-pass filter formed by resistor 150 and capacitor 152. Clamping diodes 154 limit the voltage that can be applied to the input port of the microprocessor 124, while pull-up resistor 156 biases the input to the microprocessor 124 high. The logic level on the DIR line is controlled by manually actuating a switch 158 to either of two positions.

The multiplexer 12 includes a four-input analog switch 160 controlled by the logic signals from ports PB2 and PB4 of the microprocessor 124. Two of the inputs to the analog switch 160 are connected to the power terminal B1 and two connect to the power terminal B2 through respective low-pass filter networks 162, 164, respectively. The low-pass filter networks 162, 164 are formed by series inductors 166 and resistors 168 and shunt capacitors 170 and resistors 172. The voltages that can be applied to the inputs of the analog switch 160 are limited by respective clamping diodes 176. Depending on the logic levels on port PB3 of the microprocessor 124, the voltage on either power terminal B1 or power terminal B2 is switched to an operational amplifier 180 operating as a voltage follower. The operational amplifier 180 buffers the voltage from the analog switch 160 and applies it to the input terminal of the analog-to-digital converter 14.

The analog-to-digital converter 14 is implemented with a conventional analog-to-digital converter ("A/D") chip 184. When the microprocessor 124 outputs a logic LOW on port PB5, the analog-to-digital converter chip 184 begins to convert the voltage from the analog switch 160 to its 8-bit digital representation. When the A/D chip 184 has determined the value of a voltage applied to its input, it applies a logic LOW to the interrupt request input IRQ to the microprocessor 124. The microprocessor 124 then executes an interrupt routine which reads the 8-bit word that the A/D chip 184 applies to ports PA0-7 of the microprocessor 124. The IRQ input to the microprocessor 124 is biased high through resistor 188. The A/D chip 184 can be programmed to perform its function by an 8-bit digital word output from the PA0-7 ports of the microprocessor 124 when the PB4 port of the microprocessor 124 applies a logic LOW to the write port of the A/D chip 184.

From the above, it is apparent that the microprocessor 124 can sample the voltage on either power terminal B1 or power terminal B2, and it can selectively cause the switch 8 to permit current flow between the power terminals B1 and B2. The operation of the microprocessor 124 depends upon its internally stored software program, the preferred embodiment of which is shown in FIGS. 4-8.

Figure 4:
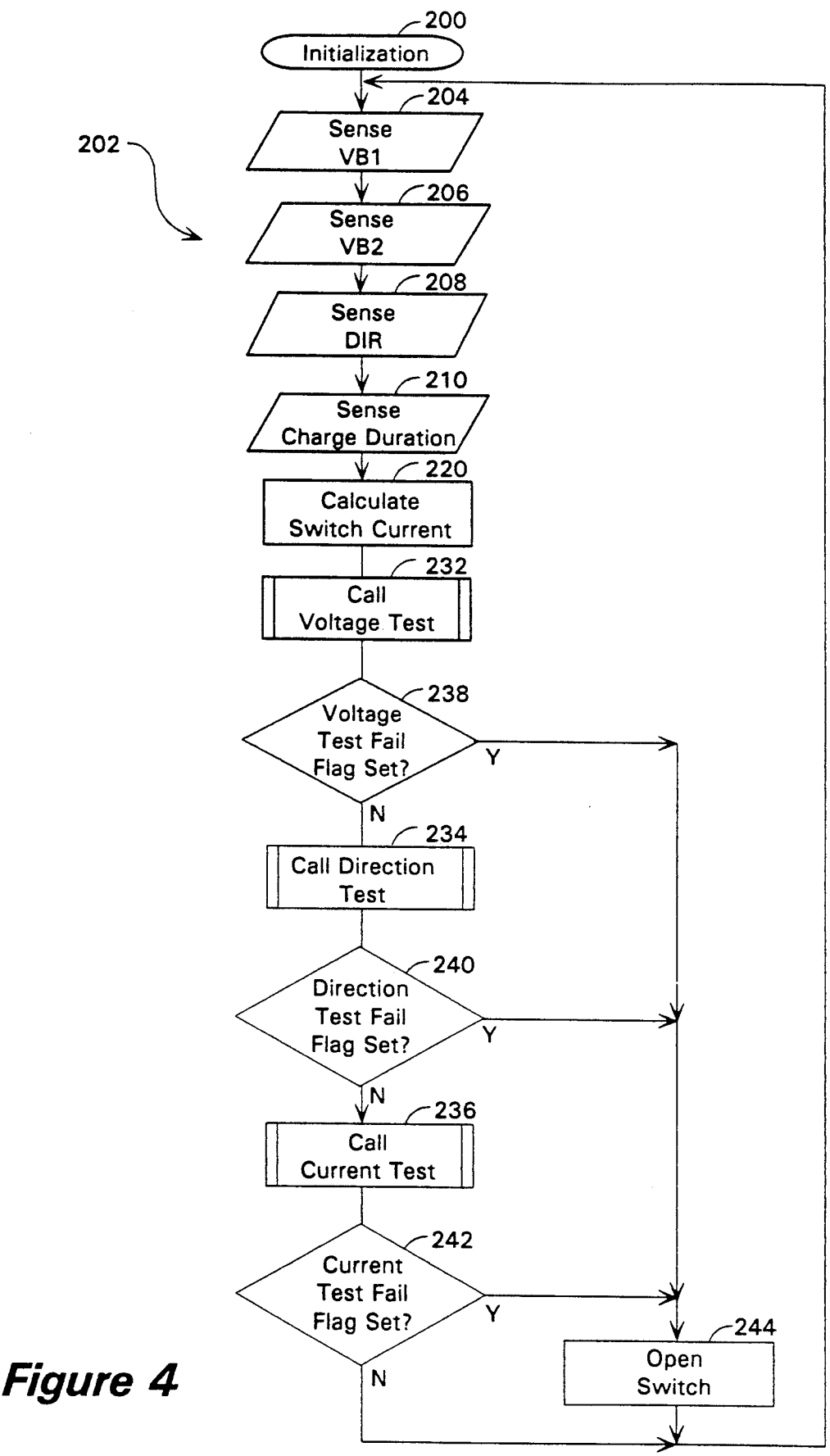
FIG. 4 is a flow chart of a main program for the computer software used in the embodiment of FIG. 3.

The main program for the microprocessor 124 is illustrated in FIG. 4. As is well known in the art, it is normally necessary for a microprocessor based system to be initialized prior to executing programs. In the preferred embodiment, initialization occurs at step 200. During initialization, random access memory ("RAM") internal to the microprocessor 124 is cleared, various hardware components are set, and an internal clock in the microprocessor 124 is started.

After initialization has been completed at 200, the program progresses to a series of input sensing steps 202. In the first input sensing step 204, the voltage of battery 1, i.e., the voltage on terminal B1 is sensed. This is accomplished by the microprocessor 124 outputting a logic LOW at its PB2 output port, thereby causing the multiplexer 160 FIG. 3) to couple the B1 terminal to the A/D converter 184. A/D converter then outputs an 8-bit word indicative of the voltage on terminal B1 to I/O ports PA0-7 of the microprocessor 124.

At step 206, the microprocessor 126 senses the voltage on the terminal B2. The program causes the microprocessor 124 to perform this function in the same manner as described above with respect to terminal B1 except that the microprocessor 124 output a logic HIGH on its PB2 output port so that the multiplexer 160 connects the terminal B2 to the A/D converter 184.

In normal operation, the battery connected to B1 will be the accessory battery to which a battery charger is connected. The battery connected to terminal B2 will thus be the reserve battery. During charging, the accessory battery will normally be at a voltage that is greater than the voltage of the reserve battery so that current will flow from the accessory battery/charger combination to the reserve battery. However, the system can be operated with the accessory battery connected to terminal B2 and the reserve battery connected to terminal B1 by placing a logic LOW on the direction input DIR. The microprocessor 124 senses the logic level of the direction input DIR at step 208 so that it will then allow current to flow from terminal B2 to terminal B1. The logic level on line DIR is controlled by manually switch 158 FIG. 3).

The final input sensing step 202 is the sensing of the lapse of time since the start of a charging cycle so that the duration of various charging steps can be determined. The microprocessor 124 performs this function by reading its internal clock at 210.

After the input sensing steps 202 have been completed, the program illustrated in FIG. 4 calculates a running average of the current flow through the switch 8 (FIG. 2) at 220. The running average is calculated based upon the difference in voltage between terminals B1 and B2 and the known resistances of the MOSFET transistors 60 and 62 (FIG. 3) and series resistors 64.

The running average of current is computed by keeping a running total of elapsed time (in any arbitrary units) in an internal running counter that retains the product of elapsed time and current flow over that elapsed time. For example, 5 Amps flowing during an elapsed time of 4 units of time (e.g., seconds, milliseconds, etc.) followed by 10 Amps flowing during an elapsed time of 1 unit of time is an average current of 6 Amps, i.e., $[[5\times4]+[10\times1]]/5$. It should be noted that an average current calculation is made even if no current is flowing through the MOSFET transistors 60, 62. Periods of no current flow will, of course, reduce the calculated average current thus allowing greater current flow at other times.

As explained below, it is important to limit the average current flowing through the MOSFET transistors 60 and 62 because the amount of current that any MOSFET transistor is capable of conducting is thermally limited. By sensing the average current passing through the MOSFET transistors 60 and 62, the microprocessor is able to take action to prevent excessive current flow, as explained in greater detail below.

After the average current is calculated at 220, a series of limit sensing test subroutines are performed. These limit test subroutines include a voltage test subroutine 232, a direction test subroutine 234 and a current test subroutine 236. As explained below, if any of these tests are determined at 238, 240 or 242 to have failed, the switch 8 (FIG. 2) is turned off at 244, thereby isolating the two battery terminals B1 and B2 from each other.

Figure 5:
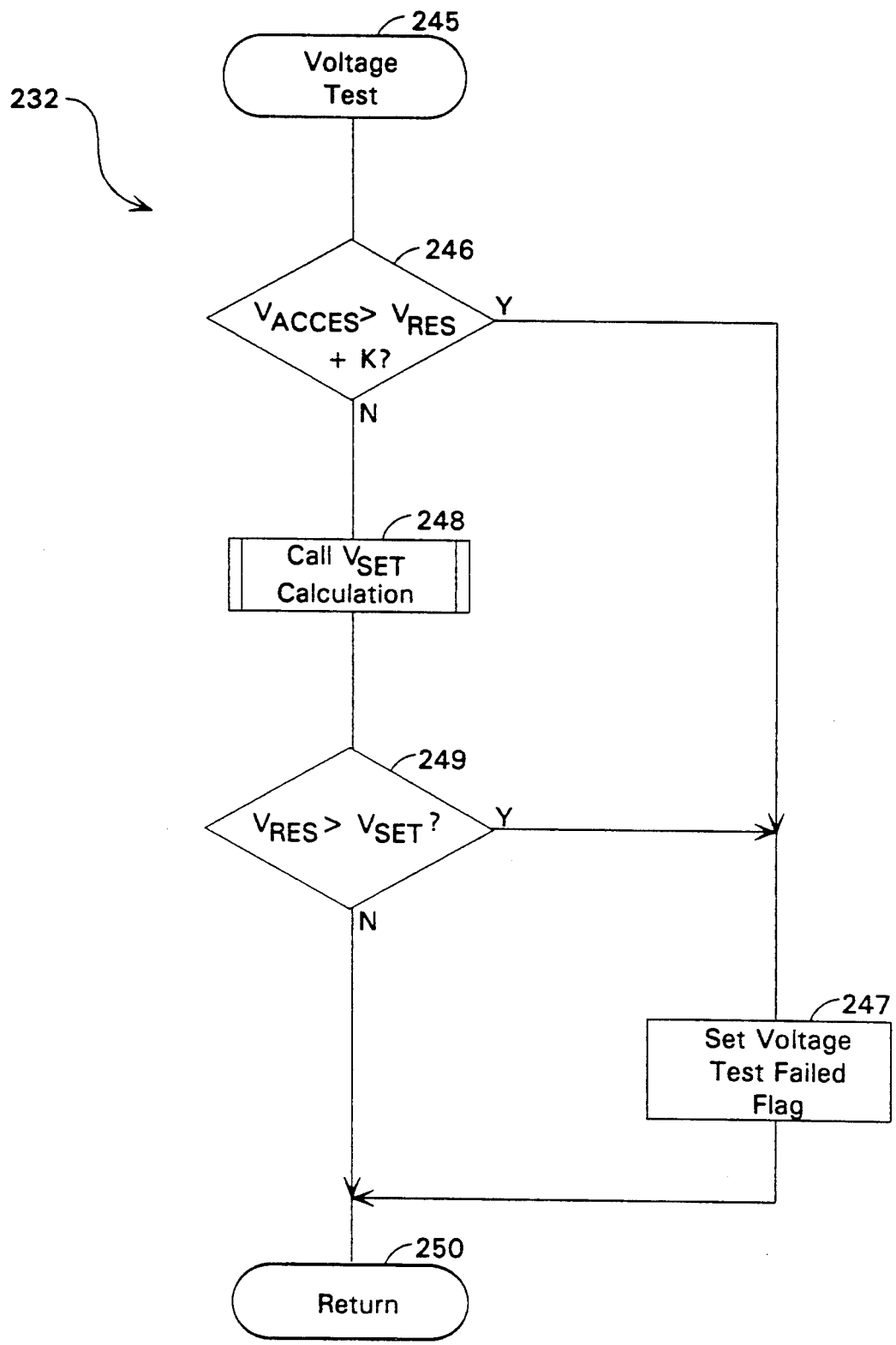
FIG. 5 is a flow chart of a voltage test subroutine for the computer software used in the embodiment of FIG. 3.

As illustrated in FIG. 5, the voltage test subroutine 232 is entered at 245, and it uses the voltages sensed on the battery terminals B1 and B2 at steps 204 and 206, above. At step 246, the microprocessor 126 ensures that the voltage at the accessory battery terminal (B1 unless line DIR is logic LOW) is not greater than the voltage on the reserve battery terminal by more than a predetermined value. If the voltage at the accessory battery terminal is too much greater than the voltage on the reserve battery terminal, a voltage test fail flag is set at 247 thereby causing the switch 8 to be opened to isolate the battery terminals B1 and B2 from each other. The purpose of this test is to limit the voltage that the batteries can place across the switch 8 when the switch 8 is conducting in order to limit the peak current through the switch 8. In the preferred embodiment, the predetermined voltage used for this step 246 is 16 volts for 12 volt batteries, and 32 volts for 24 volt batteries, although other values could be used.

In the second part of the voltage test subroutine 232, a subroutine is called at 248 that calculates a setpoint $V_{SET}$ in a manner to be described below. The voltage on the reserve battery is then compared to this setpoint at 249. If the voltage on the reserve battery terminal (normally B2) is determined at step 249 to be greater than the setpoint $V_{SET}$, the voltage test fail flag is set at 247 to cause the microprocessor 124 to open the switch 8. The subroutine then returns to the main program through 250.

Figure 6:
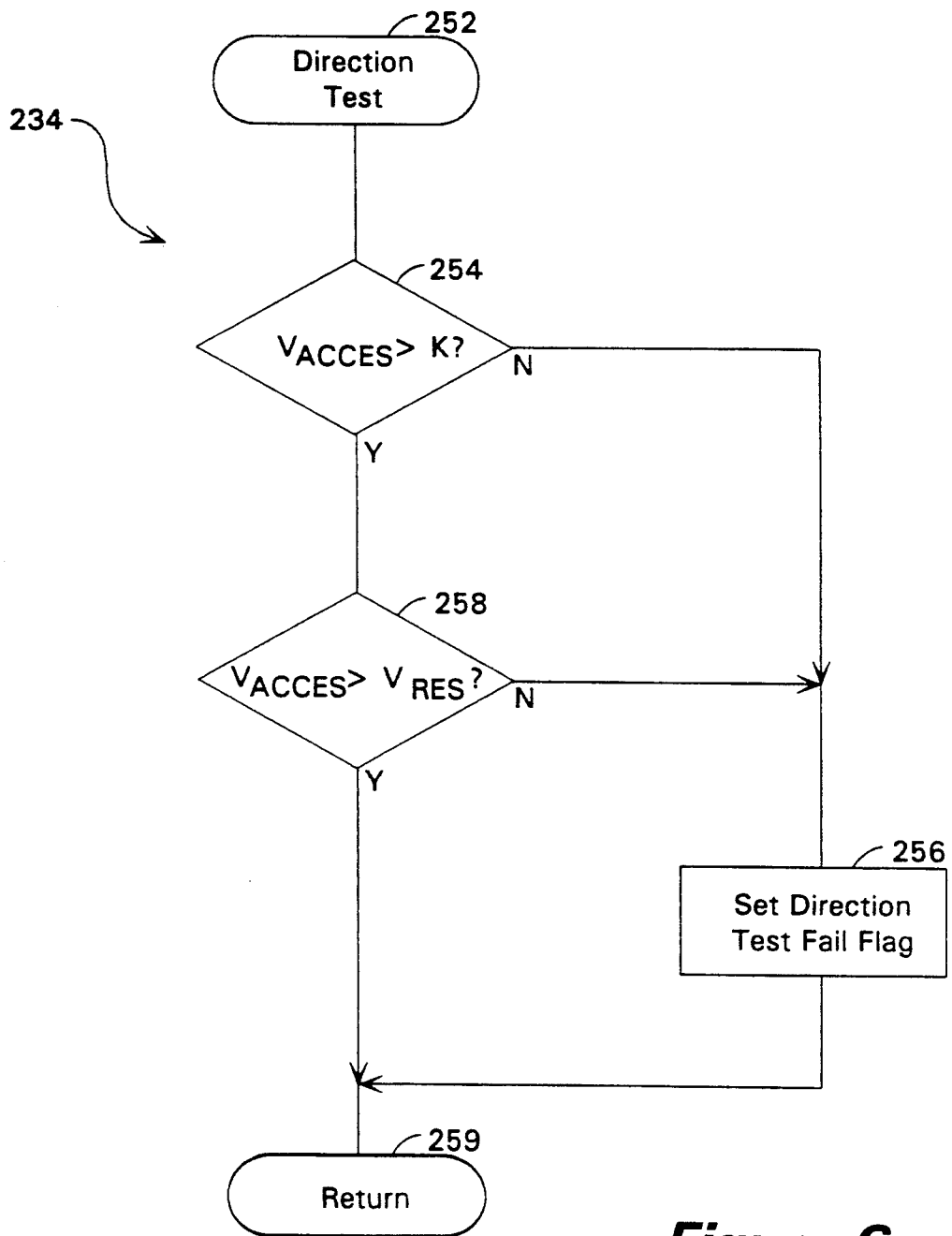
FIG. 6 is a flow chart of a direction test subroutine for the computer software used in the embodiment of FIG. 3.

After the voltage test subroutine 232 has been conducted, the microprocessor 124 performs the direction test subroutine 234, which is illustrated in FIG. 6. The direction test subroutine 234, is entered at 252, and, at 254, the microprocessor 124 ensures that the voltage on the accessory battery terminal (normally B1) is sufficiently large to charge the reserve battery. If the voltage on the accessory battery terminal is too low, a direction test fail flag is set at 256 to cause the microprocessor 124 to open the switch 8 at steps 240, 244 (FIG. 4) as described above. Although other values may be used, in the preferred embodiment, the voltage on the accessory battery terminal must be at least 13.2 volts for a 12 volt system and at least 26.4 volts for a 24 volt system in order for the switch 8 to be closed.

The second part of the direction test subroutine 234, which is performed at 258, determines whether the voltage of the accessory battery is greater than the voltage of the reserve battery. If the voltage of the reserve battery was greater than the voltage of the accessory battery, then current would flow from the reserve battery to the accessory battery, thereby discharging the reserve battery. Thus, if the voltage of the reserve battery is determined at 258 to be greater than the voltage of the accessory battery, the direction test fail flag is set at 256 to cause the microprocessor 124 to open the switch 8, as described above, to prevent the accessory battery from discharging the reserve battery. The direction test subroutine 234 is then exited through a return to the main program through 259.

Figure 7:
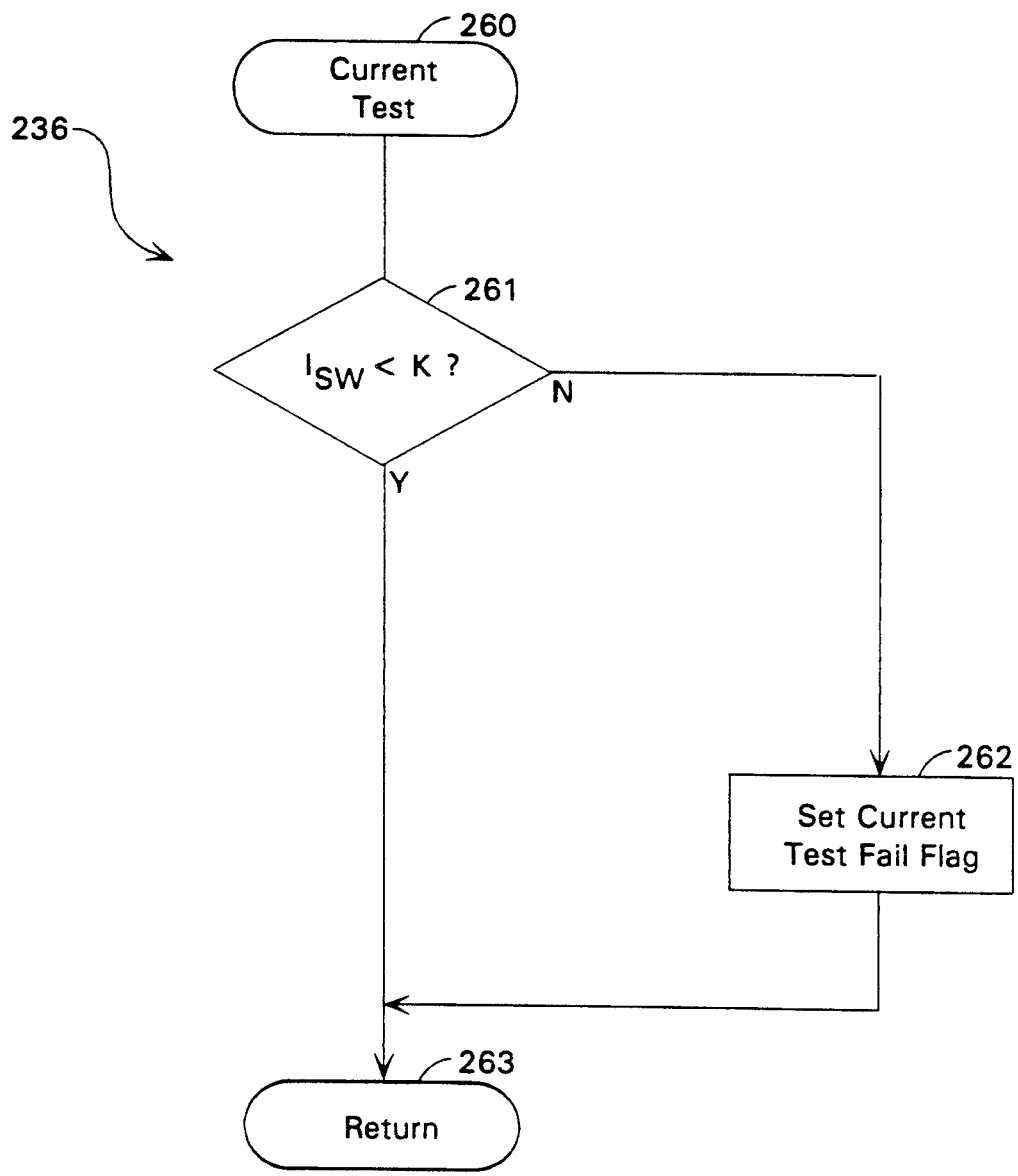
FIG. 7 is a flow chart of a current test subroutine for the computer software used in the embodiment of FIG. 3.
Figure 8A:
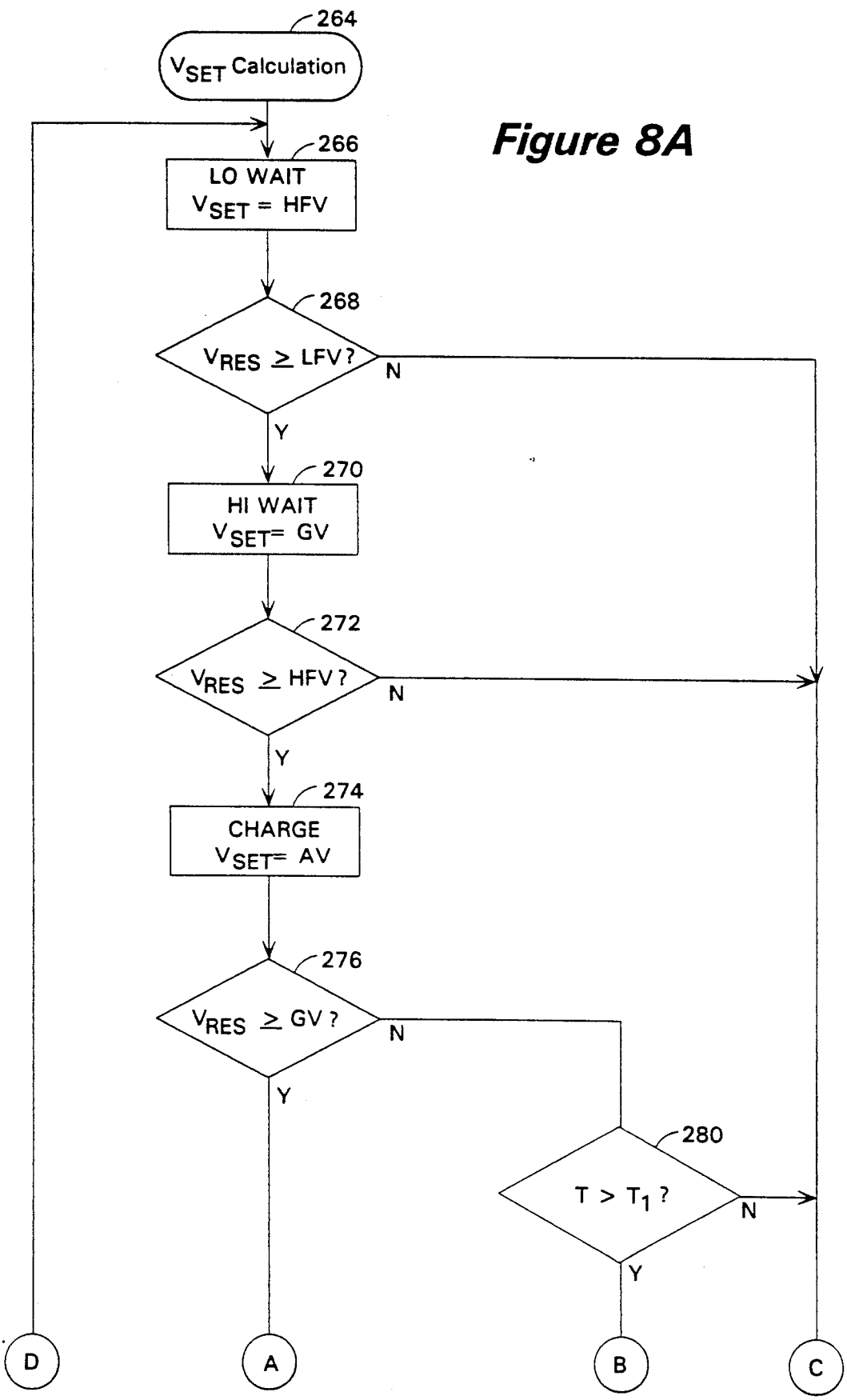
FIGS. 8A, 8B and 8C is a flow chart of a setpoint calculation subroutine for the computer software used in the embodiment of FIG. 3.
Figure 8B:
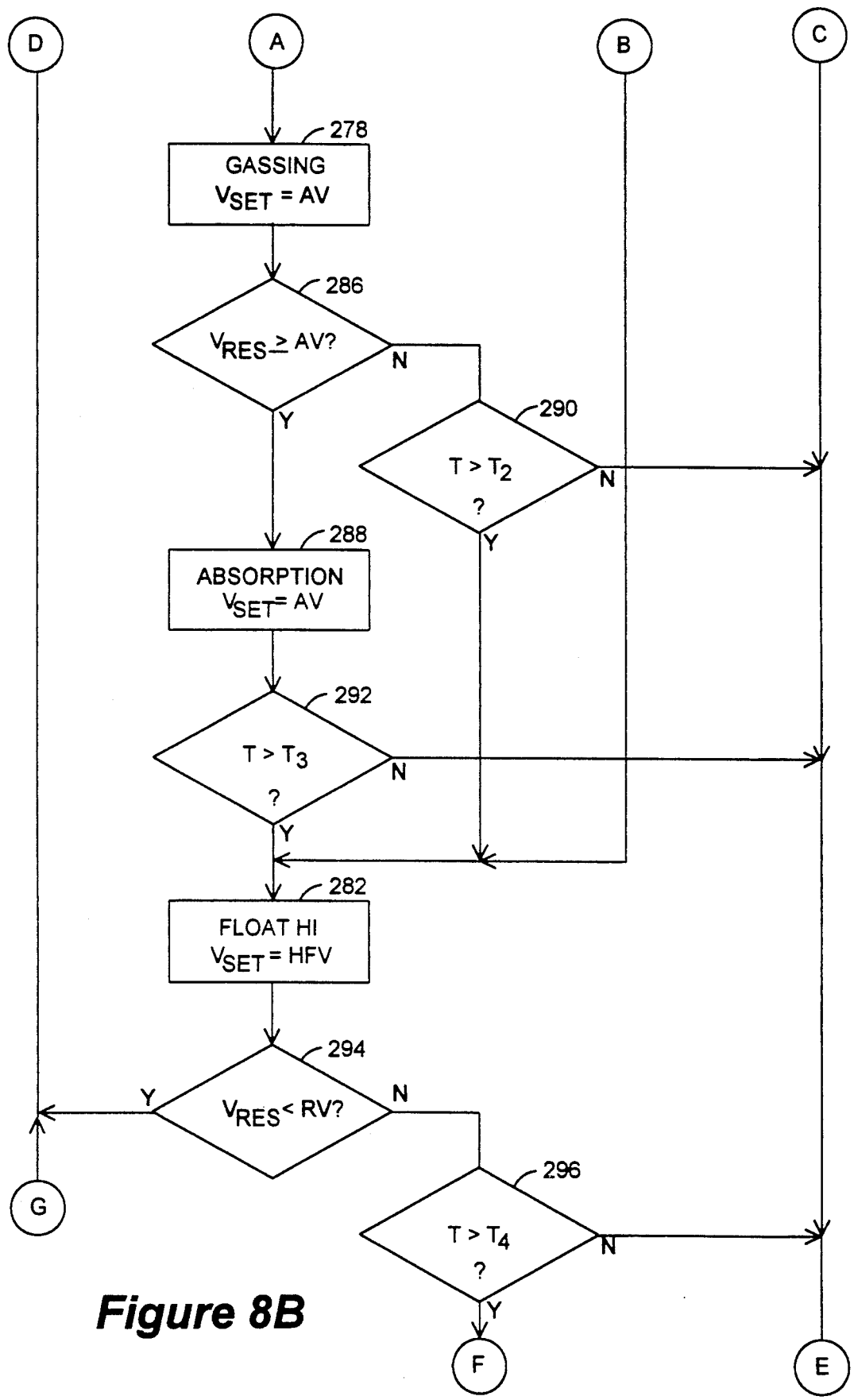
Figure 8C:
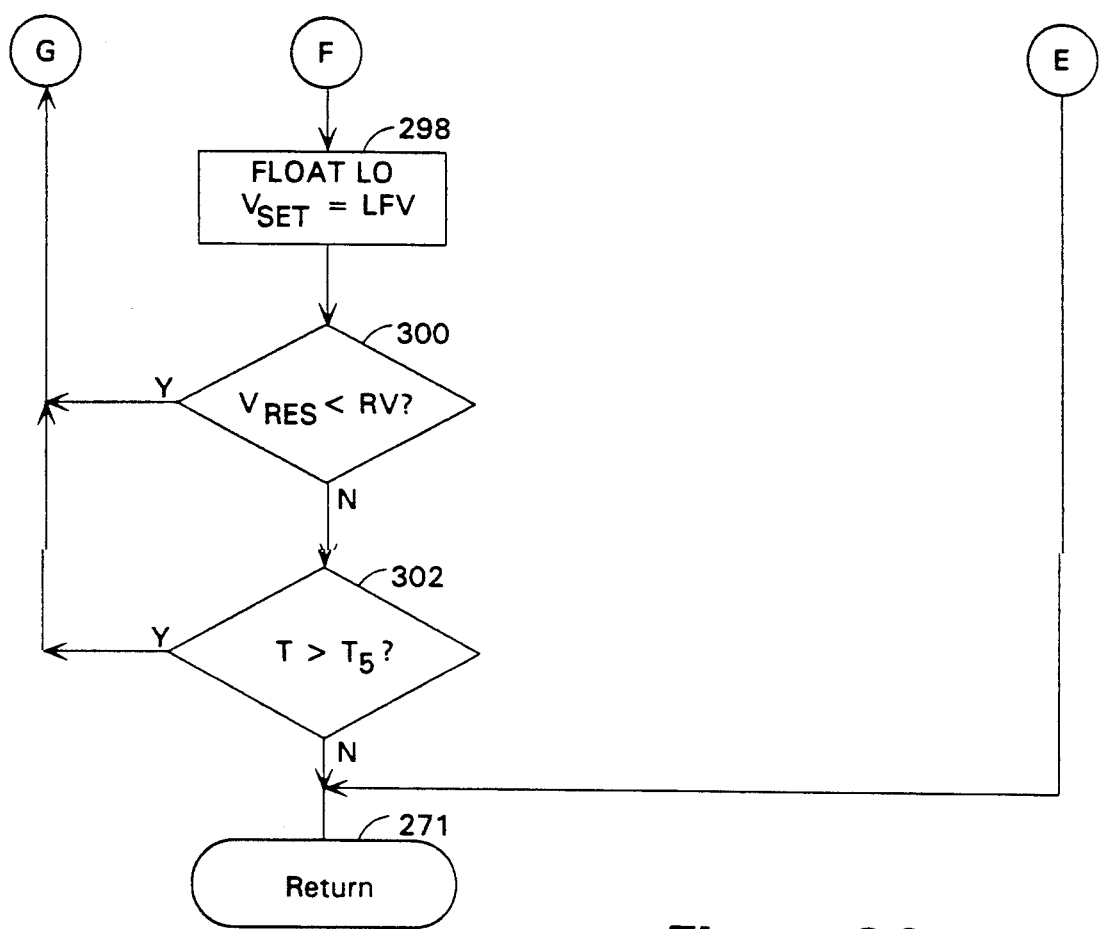

As mentioned above, the current test subroutine 236 is performed after the direction test subroutine 234. The current test subroutine 236, which is illustrated in FIG. 7, is entered at 260. At 261, the microprocessor 124 ensures that the average current through the switch, as calculated at step 220, is less than a predetermined current limit. If the average current through the switch 8 is greater than the predetermined current limit, then a current test fail flag is set at 262 to cause the microprocessor 126 to open the switch 8 at steps 240, 244 (FIG. 4), as described above, to prevent the switch 8 from being damaged by excessive heat. Although the value of the current limit will depend upon such factors as the current capacity of the switch 8, whether it is mounted in a heat sink, etc., the preferred embodiment uses a current limit of 5 amps. The current test subroutine 236 then exits by returning to the main program through 263.

It will be recalled that, at step 244 (FIG. 4), the microprocessor 124 opens the switch 8 if the voltage on the reserve battery terminal is determined at 249 (FIG. 5) to be greater than a setpoint $V_{SET}$. As also mentioned above, the setpoint $V_{SET}$ is calculated in a calculate setpoint subroutine, which is called at 248 (FIG. 5) and illustrated in FIGS. 8A, 8B and 8C. The calculate setpoint subroutine basically selects setpoints so that the reserve battery is brought up to a full charge and then maintained at a safe, non-gassing float voltage. The calculate setpoint subroutine is entered at 264, and the setpoint is placed at a high float voltage in a LO WAIT state at 266. The setpoint used at step 249 remains at the high float voltage until the voltage of the reserve battery is determined at 268 to have reached a low float voltage. The program then proceeds to 270 where the setpoint is determined in a HI WAIT state. If the reserve battery voltage has not reached the low float voltage, the setpoint remains at the high float voltage by exiting the subroutine through 271. The high and low float voltages can be selected to any optimum value. However, in the preferred embodiment of the invention the high float voltage is 13.6 volts for a 12 volt system and 27.2 volts for a 24 volt system. The low float voltages are 13.4 volts and 26.8 volts for 12 and 24 volt systems, respectively.

In the HI WAIT state at 270, the setpoint is established at a gassing voltage for as long as the voltage of the reserve battery has not been determined at 272 to have not risen to the above described high float voltage. In the preferred embodiment the gassing voltage is 13.8 volts for a 12 volt battery and 27.6 volts for a 24 volt battery. When the reserve battery is determined at 272 to have reached the high float voltage, the program enters a CHARGE state at 274. If the reserve battery voltage has not been determined at 272 to have reached the high float voltage, the setpoint remains at the gassing voltage by exiting the subroutine through 271.

The setpoint in the CHARGE state 274 is established at an absorption voltage and remains there until it is determined at 276 that the voltage of the reserve battery has reached the above described gassing voltage. The program then branches to a GASSING state at 278. However, if the voltage of the reserve battery has not reached the gassing voltage at the expiration of a predetermined time in the CHARGE state, as determined at 280, then the program branches to a HI FLOAT state at 282. If the reserve battery voltage has not reached the absorption voltage and this predetermined time has not expired, the setpoint remains at the absorption voltage by exiting the subroutine through 271. In the preferred embodiment, the predetermined time in the CHARGE state is 6 hours, and the absorption voltage are 14.4 volts and 28.8 volts for 12 and 24 volt batteries, respectively. However, other values could also be selected.

In the GASSING state 278, the setpoint is established at the above described absorption voltage until it is determined at 286 that the voltage of the reserve battery has reached the absorption voltage. If the voltage of the reserve battery has reached the absorption voltage, an ABSORPTION state is entered at 288. However, if the voltage of the reserve battery is not determined at 286 to have reached the absorption voltage, the program checks at 290 to determine if a predetermined time in the GASSING state has expired. In the preferred embodiment, this predetermined time is 30 minutes. If the predetermined charge time in the GASSING state has expired, the program branches to the FLOAT HI state 282. Otherwise, the setpoint remains at the absorption voltage by exiting the subroutine through 271.

In the ABSORPTION state 288, the setpoint is established at the above described absorption voltage and the program then checks at 292 to determine if a predetermined period in the ABSORPTION state has expired. In the preferred embodiment, this predetermined time is 10 minutes. The setpoint remains at the absorption voltage by exiting the subroutine through 271 until this predetermined period has expired. When the predetermined period has expired, the program branches to the FLOAT HI state 282. As explained above, the HI FLOAT state can also be entered from the CHARGE state 274 via steps 276 and 280, and from the GASSING state 278 via steps 286 and 290.

The FLOAT HI state 282 establishes the setpoint at the above described high float voltage. The voltage of the reserve battery is compared to a recharge voltage at 294. If the voltage of the reserve battery has fallen to the recharge voltage, the subroutine returns to the LO WAIT state 266 where the setpoint is established at the high float voltage, and the above-described procedure is repeated. If the voltage of the reserve battery is determined at 294 not to have fallen to the recharge voltage, the program branches to 296 to determine if a predetermined period in the FLOAT HI state 282 has expired. If the program determines at 296 that the predetermined FLOAT HI period has expired, a FLOAT LO state 298 is entered. Otherwise, the setpoint remains at the high float voltage by exiting the subroutine through 271. In the preferred embodiment, the predetermined period is 6 hours, and the recharge voltage is 12.7 volts for a 12 volt battery and 25.4 volts for a 24 volt battery.

The setpoint is established in the FLOAT LO state 298 at the above described low float voltage. The program then checks at 300 to determine if the voltage of the reserve battery has fallen below the recharge voltage. If so, the program branches back to the LO WAIT state 266, thereby establishing the setpoint at the high float voltage. If the voltage of the reserve battery has not been determined at 300 to have fallen below the recharge voltage, the program checks at 302 to determine if a predetermined FLOAT HI period has expired. If this predetermined time has expired, the program also branches back to the LO WAIT state 266. Otherwise, the setpoint remains at the low float voltage by exiting the subroutine through 271. In the preferred embodiment, the predetermined FLOAT HI period is 21 days.

Although a specific setpoint establishing procedure has been described for the preferred embodiment, it will be understood that different values of predetermined periods or voltages may be used. Also, the number of states that are used can be either fewer or greater as desired. All that is important is that the switch 8 be controlled so that the reserve battery undergoes an appropriate charging schedule.

It is thus seen that the inventive isolator allows a single charger to charge two or more batteries while allowing the batteries to be separately discharged without the drawbacks of mechanical switches or diode isolators.

I claim:

1. A battery isolator for isolating a first battery from a second battery while allowing said first and second batteries to be charged by a common battery charger, said isolator comprising:
   an electrically controlled switch connected between said first and second batteries, said switch having a predetermined resistance;
   a voltage measuring circuit sensing the voltage of said first and second batteries and generating respective output signals indicative thereof; and
   a controller operatively connected to said electrically controlled switch and to said voltage measuring circuit, said controller opening and closing said switch in response to the output signals of said voltage measuring circuit in accordance with a predetermined relationship between the voltages of said first and second batteries, whereby said controller controls said switch to selectively permit current to flow from said battery charger connected to said first battery to said second battery while isolating said first and second batteries from each other when said batteries are being discharged, said controller further opening said switch when the ratio of the difference between the voltages of said first and second batteries to said resistance corresponds to a current flow through said switch from said first battery to said second battery that is greater than a predetermined magnitude.

2. A battery isolator for isolating a first battery from a second battery while allowing said first and second batteries to be charged by a common battery charger, said isolator comprising:
   an electrically controlled switch connected between said first and second batteries;
   a voltage measuring circuit sensing the voltage of said first and second batteries and generating respective output signals indicative thereof; and
   a controller operatively connected to said electrically controlled switch and to said voltage measuring circuit, said controller opening and closing said switch in response to the output signals of said voltage measuring circuit in accordance with a predetermined relationship between the voltages of said first and second batteries, whereby said controller controls said switch to selectively permit current to flow from said battery charger connected to said first battery to said second battery while isolating said first and second batteries from each other when said batteries are being discharged, said controller further opening said switch when said voltage measuring circuit generates an output signal indicating that the voltage of said second battery is larger than a predetermined value.

3. The battery isolator of claim 2 wherein said controller establishes said predetermined value at a plurality of levels during the charging of said second battery.

4. The battery isolator of claim 3 wherein said plurality of values at which said controller establishes said predetermined value comprises:
   a high float voltage during a low wait state either when said controller initially closes said switch, if the voltage of said second battery fell to a recharge voltage during a float high state. if the voltage of said second battery fell to said recharge voltage during a float low state, or a first predetermined period expired during said float low state, said predetermined value remaining at said high float voltage until the voltage of said second battery has risen to a low float voltage;
   a gassing voltage during a high wait state when the voltage of said second battery rose to said low float voltage during said low wait state, said predetermined value remaining at said gassing voltage until the voltage of said second battery has risen to said high float voltage;
   an absorption voltage during a charge state when the voltage of said second battery rose to said high float voltage during said high wait state, said predetermined value remaining at said absorption voltage until the earlier of a second predetermined time period or the voltage of said second battery has risen to said gassing voltage;
   said absorption voltage during a gassing state if the voltage of said second battery rose to said gassing voltage during said charge state, said predetermined value remaining at said absorption voltage until the earlier of a third predetermined time period or the voltage of said second battery has risen to said absorption voltage;

said absorption voltage during an absorption state if the voltage of said second battery rose to said absorption voltage during said gassing state, said predetermined value remaining at said absorption voltage until the expiration of a fourth predetermined time period;

said high float voltage during said float high state either if said second predetermined time period expired during said charge state, if said third predetermined time period expired during said gassing state, or if said fourth predetermined time period expired during said absorption state, said predetermined value remaining at said high float voltage until the earlier of a fifth predetermined time period or the voltage of said second battery has fallen to said recharge voltage; and a low float voltage during said float low state if said fifth predetermined time period expired during said float high state, said predetermined value remaining at said high float voltage until the earlier of said first predetermined time period or the voltage of said second battery has fallen to said recharge voltage.

5. The battery isolator of claim 4 wherein said predetermined time periods and said voltages are substantially as follows:

| | |
|---|---|
| First Predetermined Time Period | 21 days |
| Second Predetermined Time Period | 6 hours |
| Third Predetermined Time Period | 30 minutes |
| Fourth Predetermined Time Period | 10 minutes |
| Fifth Predetermined Time Period | 6 hours |
| Low Float Voltage | 13.4X |
| High Float Voltage | 13.6X |
| Gassing Voltage | 13.8X |
| Absorption Voltage | 14.4X |
| Recharge Voltage | 12.7X | where the variable X is the ratio of the voltage rating of said second battery to 12 volts.

6. A battery isolator for isolating a first battery from a second battery while allowing said first and second batteries to be charged by a common battery charger, said isolator comprising:

an electrically controlled switch connected between said first and second batteries;

a voltage measuring circuit sensing the voltage of said first and second batteries and generating respective output signals indicative thereof, said voltage measuring circuit including an analog-to-digital converter generating respective first and second digital words indicative of the voltages of said first and second batteries; and a controller operatively connected to said electrically controlled switch and to said voltage measuring circuit, said controller opening and closing said switch in response to the output signals of said voltage measuring circuit in accordance with a predetermined relationship between the voltages of said first and second batteries, whereby said controller controls said switch to selectively permit current to flow from said battery charger connected to said first battery to said second battery while isolating said first and second batteries from each other when said batteries are being discharged, said controller further including a properly programmed microprocessor receiving said first and second digital words from said analog-to-digital converter, said microprocessor having an output port operatively connected to said switch so that said microprocessor can open and close said switch in accordance with a predetermined relationship between the voltages corresponding to said first and second digital words.

7. The battery isolator of claim 6 wherein said microprocessor allows current to flow from said first battery to said second battery while preventing current from flowing from said second battery to said first battery by opening said switch whenever the voltages corresponding to said first and second digital words indicate that the voltage of said second battery is greater than the voltage of said first battery.

8. The battery isolator of claim 7 wherein said microprocessor includes an input port receiving a manually selectable direction signal, and wherein the operation of said microprocessor is altered responsive to said direction signal to allow current to flow from said second battery to said first battery while preventing current from flowing from said first battery to said second battery by opening said switch whenever the voltages corresponding to said first and second digital words indicate that the voltage of said first battery is greater than the voltage of said second battery, thereby altering the direction of permissible current flow through said switch in response to said direction signal.

9. A battery isolator for isolating a first battery from a second battery while allowing said first and second batteries to be charged by a common battery charger, said isolator comprising:

an electrically controlled switch connected between said first and second batteries, said electrically controlled switch including:

a first MOSFET transistor having its drain electrically connected to the first battery; and a second MOSFET transistor having its source connected to the source of said first MOSFET transistor, its gate connected to the gate of said first MOSFET transistor, and its drain series connected to the second battery;

a voltage measuring circuit sensing the voltage of said first and second batteries and generating respective output signals indicative thereof; and a controller operatively connected to said electrically controlled switch and to said voltage measuring circuit, said controller opening and closing said switch in response to the output signals of said voltage measuring circuit in accordance with a predetermined relationship between the voltages of said first and second batteries, whereby said controller controls said switch to selectively permit current to flow from said battery charger connected to said first battery to said second battery while isolating said first and second batteries from each other when said batteries are being discharged.

10. The battery isolator of claim 9 wherein said switch further includes bootstrap circuit means for automatically boosting the amplitude of a control voltage applied to the gates of said MOSFET transistors when said transistors are turned on, thereby connecting the sources of said MOSFET transistors to their respective batteries, said bootstrap circuit means comprising:

a transistor switch coupled to the gates of said MOSFET transistors, said transistor switch changing state to generate said control voltage responsive to a signal from said controller, said control voltage having an amplitude that is proportional to the voltage on said transistor switch;

a capacitor having first and second leads, said first lead being connected to the sources of said MOSFET transistors and said second lead being connected to the power supply terminal of said transistor switch;

a first diode connected between the second lead of said capacitor and a supply voltage having the same polarity as the voltages of said batteries, the anode and cathode of said first diode being oriented to allow said capacitor to charge through said first diode so that, when the voltage on the sources of said MOSFET transistors increase as they are connected to respective batteries, said increase in voltage on the sources of said MOSFET transistors is coupled by said capacitor to the power supply terminal of said transistor switch, thereby causing an increases in the voltage of said control voltage applied to the gates of said MOSFET transistors by said transistor switch to substantially the sum of the voltage to which said capacitor has been charged through said first diode and the voltage of said batteries.

11. A method of isolating a first battery from a second battery while allowing said first and second batteries to be charged by a common battery charger, said method comprising:

measuring the voltages of said first and second batteries;

connecting said first and second batteries to each other through a conductor having a predetermined resistance thereby permitting current to flow from a battery charger connected to said first battery to said second battery; and disconnecting said first and second batteries from each other whenever the ratio of the difference between the voltages of said first and second batteries to said resistance corresponds to a current flow between said first and second batteries that is greater than a predetermined magnitude.

12. A method of isolating a first battery from a second battery while allowing said first and second batteries to be charged by a common battery charger, said method comprising;

measuring the voltages of said first and second batteries;

connecting said first and second batteries to each other through a conductor having a predetermined resistance thereby permitting current to flow from a battery charger connected to said first battery to said second battery; and disconnecting said first and second batteries from each other whenever the voltage of said second battery is larger than a predetermined value.

13. The method battery isolator of claim 12 wherein said predetermined value is established at a plurality of levels during the charging of said second battery.

14. The method of claim 13 wherein said plurality of values comprises:

a high float voltage during a low wait state either when said first battery is initially connected to said second battery, if the voltage of said second battery fell to a recharge voltage during a float high state, if the voltage of said second battery fell to said recharge voltage during a float low state, or a first predetermined period expired during said float low state, said predetermined value remaining at said high float voltage until the voltage of said second battery has risen to a low float voltage;

a gassing voltage during a high wait state when the voltage of said second battery rose to said low float voltage during said low wait state, said predetermined value remaining at said gassing voltage until the voltage of said second battery has risen to said high float voltage;

an absorption voltage during a charge state when the voltage of said second battery rose to said high float voltage during said high wait state, said predetermined value remaining at said absorption voltage until the earlier of a second predetermined time period or the voltage of said second battery has risen to said gassing voltage;

said absorption voltage during a gassing state if the voltage of said second battery rose to said gassing voltage during said charge state, said predetermined value remaining at said absorption voltage until the earlier of a third predetermined time period or the voltage of said second battery has risen to said absorption voltage;

said absorption voltage during an absorption state if the voltage of said second battery rose to said absorption voltage during said gassing state, said predetermined value remaining at said absorption voltage until the expiration of a fourth predetermined time period;

said high float voltage during said float high state either if said second predetermined time period expired during said charge state, if said third predetermined time period expired during said gassing state, or if said fourth predetermined time period expired during said absorption state, said predetermined value remaining at said high float voltage until the earlier of a fifth predetermined time period or the voltage of said second battery has fallen to said recharge voltage; and a low float voltage during said float low state if said fifth predetermined time period expired during said float high state, said predetermined value remaining at said high float voltage until the earlier of said first predetermined time period or the voltage of said second battery has fallen to said recharge voltage.

15. The method of claim 14 wherein said predetermined time periods and said voltages are substantially as follows:

| | |
|---|---|
| First Predetermined Time Period | 21 days |
| Second Predetermined Time Period | 6 hours |
| Third Predetermined Time Period | 30 minutes |
| Fourth Predetermined Time Period | 10 minutes |
| Fifth Predetermined Time Period | 6 hours |
| Low Float Voltage | 13.4X |
| High Float Voltage | 13.6X |
| Gassing Voltage | 13.8X |
| Absorption Voltage | 14.4X |
| Recharge Voltage | 12.7X | where the variable X is the ratio of the voltage rating of said second battery to 12 volts.

16. The battery isolator of claim 10 further including an impedance element connected to the first lead of said capacitor to discharge said capacitor at a predetermined rate so that said capacitor must be periodically recharged by periodically opening said switches in order for said control voltage to have a sufficiently large magnitude to turn on said MOSFET switches, whereby a failure of said controller allows said capacitor to discharge thereby turning off said MOSFET switches and isolating said batteries from each other.

* * * * *